US007065089B2

(12) United States Patent
Kuhl et al.

(10) Patent No.: US 7,065,089 B2
(45) Date of Patent: Jun. 20, 2006

(54) METHOD AND SYSTEM FOR MEDIATING TRAFFIC BETWEEN AN ASYNCHRONOUS TRANSFER MODE (ATM) NETWORK AND AN ADJACENT NETWORK

(75) Inventors: Timothy Harris Kuhl, Kanata (CA); Mark Jason Thibodeau, Nepean (CA)

(73) Assignee: Alcatel Canada Inc., Kanata (CA)

( * ) Notice: Subject to any disclaimer, the term of this patent is extended or adjusted under 35 U.S.C. 154(b) by 889 days.

(21) Appl. No.: 10/023,642

(22) Filed: Dec. 21, 2001

(65) Prior Publication Data

US 2003/0123449 A1    Jul. 3, 2003

(51) Int. Cl.
*H04L 12/56* (2006.01)

(52) U.S. Cl. .................. 370/395.2; 370/417; 370/466

(58) Field of Classification Search ........... 370/411, 370/400, 401, 352–356, 395.1, 395.21, 232, 370/230, 235, 466, 467, 412, 417, 389, 392, 370/236, 395.2; 725/109; 705/40; 709/226
See application file for complete search history.

(56) References Cited

U.S. PATENT DOCUMENTS

| | | | |
|---|---|---|---|
| 6,324,165 B1 * | 11/2001 | Fan et al. .................. 370/232 |
| 6,574,195 B1 * | 6/2003 | Roberts ..................... 370/235 |
| 6,680,933 B1 * | 1/2004 | Cheesman et al. ......... 370/352 |
| 6,775,268 B1 * | 8/2004 | Wang et al. ............... 370/352 |
| 2002/0199203 A1 * | 12/2002 | Duffy et al. ............... 725/109 |
| 2003/0048792 A1 * | 3/2003 | Xu et al. ................... 370/400 |

* cited by examiner

*Primary Examiner*—John Pezzlo
(74) *Attorney, Agent, or Firm*—McCarthy Tétrault LLP

(57) ABSTRACT

The present invention provides a system and method of mediating cell traffic between an asynchronous transmission mode (ATM) network and an adjacent network, each cell in said cell traffic having a set of transmission parameters related to the ATM network and a respective ATM connection for the cell. In an embodiment the method comprises: (i) identifying for the cell an egress queue family by utilizing a first set of parameters from said set of transmission parameters; (ii) associating with the cell one of a predefined number of egress class of service (COS) levels by mapping a second set of parameters from the set of transmission parameters into one of the egress COS levels; (iii) utilizing the egress COS level associated with the cell to select an egress queue member of the egress queue family identified in step (i), the selected egress queue member being associated with the egress COS level associated with the cell in step (ii); and (iv) providing said cell to said identified queue member for forwarding to said another network.

27 Claims, 9 Drawing Sheets

METHOD AND SYSTEM FOR MEDIATING TRAFFIC BETWEEN AN ASYNCHRONOUS TRANSFER MODE (ATM) NETWORK AND AN ADJACENT NETWORK

FIELD OF THE INVENTION

The invention relates generally to a method and system for mediating traffic between an asynchronous transfer mode (ATM) network and an adjacent network in a heterogeneous network environment.

BACKGROUND OF INVENTION

As known to those skilled in the art, various Quality of Service ("QoS") parameters may be defined by a user for each virtual path connection ("VPC") or virtual channel connection ("VCC") in an ATM network. The QoS parameters are defined on an end-to-end (i.e. system-wide) basis and may include, for example, cell delay variation ("CDV"), maximum cell transfer delay ("CTD"), cell loss ratio ("CLR"), cell error ratio ("CER"), severely errored cell block ratio ("SECBR") and cell misinsertion rate ("CMR"). A set or a subset of these various QoS parameters may define a QoS of a VPC or VCC and determines the relative priority accorded to traffic on the VPC or VCC.

In a heterogeneous network including an ATM network, in order to maintain efficient traffic flow from the ATM network to an adjacent or intermediary network and vice versa, it is necessary to effectively manage traffic at switches connecting the networks. It may be that, at a given switch connecting an ATM network to an adjacent network, the allotted ingress bandwidth for traffic having a given QoS exceeds the available egress bandwidth for that QoS. In this case, the switch may become a traffic congestion point. As will be appreciated, effective management of potential traffic congestion points will affect the overall performance of the heterogeneous network.

Heretofore, various systems have been proposed for providing mediation at a switching point in a heterogeneous network. Use of multiple priority queues has been attempted, but use of back-pressuring signals only for traffic management has provided only limited improvement. Also, while one-to-one correspondence between each class of ingress connection and each class of egress connection has been attempted for relatively small networks, this one-to-one mapping scheme quickly becomes unworkable as the number of connections grows.

Therefore, what is needed is a new and effective method and system for mediating traffic between an ATM network and an adjacent network in a heterogeneous network environment.

SUMMARY OF INVENTION

In an aspect of the invention, there is provided a method of mediating cell traffic between an asynchronous transmission mode (ATM) network and an adjacent network, each cell in said cell traffic having a set of transmission parameters related to said ATM network and a respective ATM connection for said cell, said method comprising:
(i) identifying for said cell an egress queue family by utilizing a first set of parameters from said set of transmission parameters;
(ii) associating with said cell one of a predefined number of egress class of service (COS) levels by mapping a second set of parameters from said set of transmission parameters into one of said egress COS levels;
(iii) utilizing said egress COS level associated with said cell to select an egress queue member of said egress queue family identified in step (i), said selected egress queue member being associated with said egress COS level associated with said cell in step (ii); and
(iv) providing said cell to said identified queue member for forwarding to said another network.

In an embodiment of said first aspect, said first set of parameters comprises a real-time connection indication and a resource reserved indication.

In another embodiment of said first aspect, said second set of parameters comprises at least an ATM quality of service parameter and a service category parameter.

In yet another embodiment of said first aspect, for said second set of parameters, said ATM quality of service parameters comprise a cell loss ratio parameter and a cell delay variation parameter.

In still another embodiment of said first aspect, said egress queue family in step (i) is one of a real-time (R-T) queue family, a resources reserved (RR) queue family, and a non-resources reserved (nRR) queue family.

In another embodiment of said first aspect, said R-T queue family comprises a single R-T queue member having a predefined minimum bandwidth.

In yet another embodiment of said first aspect, said RR queue family comprises eight RR queue members, each said RR queue member having a minimum bandwidth proportional to a weight assigned to each egress COS level associated with each said RR queue.

In still another embodiment of said first aspect, said non-resources reserved queue family comprises eight nRR queue members, each said nRR queue member having a relative queue priority corresponding to an egress COS level associated with each said nRR queue.

In a second aspect, the present invention provides a system for mediating cell traffic between an asynchronous transmission mode (ATM) network and an adjacent network, each cell in said cell traffic having a set of transmission parameters related to said ATM network and a respective ATM connection for said cell, said system comprising:
(a) an identifier for utilizing a first set of parameters from said set of transmission parameters to identify an egress queue family for said cell;
(b) a translator for translating a second set of parameters from said set of transmission parameters to an egress class of service (COS) level associated with said cell; and
(c) a selector for selecting an egress queue member of said egress queue family to forward said cell to said another network, said selected egress queue member being associated with said egress COS level associated with said cell.

In an embodiment of said second aspect, said first set of parameters comprises a real-time connection indication and a resource reserved indication.

In another embodiment of said second aspect, said second set of parameters comprises at least an ATM quality of service parameter and a service category parameter.

In yet another embodiment of said second aspect, for said second set of parameters, said ATM quality of service parameters comprise a cell loss ratio parameter and a cell delay variation parameter.

In still another embodiment of said second aspect, said egress queue family is one of a real-time (R-T) queue family, a resources reserved (RR) queue family, and a non-resources reserved (nRR) queue family.

In a further embodiment of said second aspect, said R-T queue family comprises a single R-T queue member having a predefined minimum bandwidth.

In yet another embodiment of said second aspect, said RR queue family comprises eight RR queue members, each said RR queue member having a minimum bandwidth proportional to a weight assigned to each egress COS level associated with each said RR queue.

In still another embodiment of said second aspect, said non-resources reserved queue family comprises eight nRR queue members, each said nRR queue member having a relative queue priority corresponding to an egress COS level associated with each said nRR queue. In a third aspect, the present invention provides a method of mediating cell traffic flows at a mediation connection between networks in a multi-protocol heterogeneous network, each cell traffic flow having associated thereto a set of transmission parameters, said method comprising:

(i) identifying for said cell traffic flow an egress queue type by utilizing a first set of parameters from said set of transmission parameters;
(ii) associating with said cell traffic flow one of a predefined number of egress class of service (COS) levels by mapping a second set of parameters from said set of transmission parameters into one of said egress COS levels;
(iii) utilizing said egress COS level associated with said cell traffic flow to select an egress queue member of said egress queue family identified in step (i), said selected egress queue member being associated with said egress COS level associated with said cell traffic flow in step (ii); and
(iv) directing said cell traffic flow to said identified queue member for forwarding to said another network.

In another embodiment of the third aspect, MPLS, IP and ATM mediation traffic flows co-exist at said mediation connection, and each of said MPLS, IP and ATM mediation traffic flows are associated with one of said egress queue types, and one of said egress COS levels.

In other aspects of the invention, various combinations and subsets of the above aspects are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes).

DETAILED DESCRIPTION OF THE INVENTION

As noted above, the present invention relates generally to a method and system for mediating traffic in a heterogeneous network comprising at least one ATM network and an adjacent network. Accordingly, for the purposes of describing an exemplary embodiment, first a description of an illustrative heterogeneous network configuration is provided, followed by a description of various components and features of the heterogeneous network as they relate to the present invention.

Heterogeneous Networks

Figure 1A:
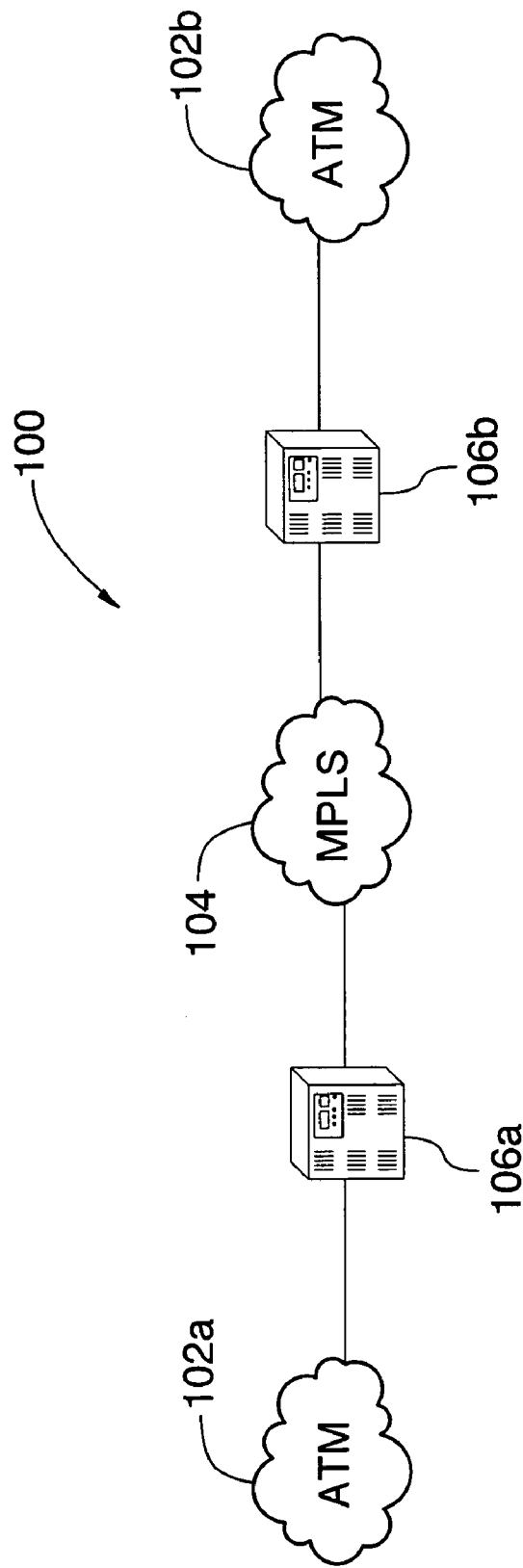
FIG. 1A is a block diagram of an exemplary heterogeneous network comprising two ATM networks connected by edge switches to an intermediary MPLS core or network.
Figure 1B:
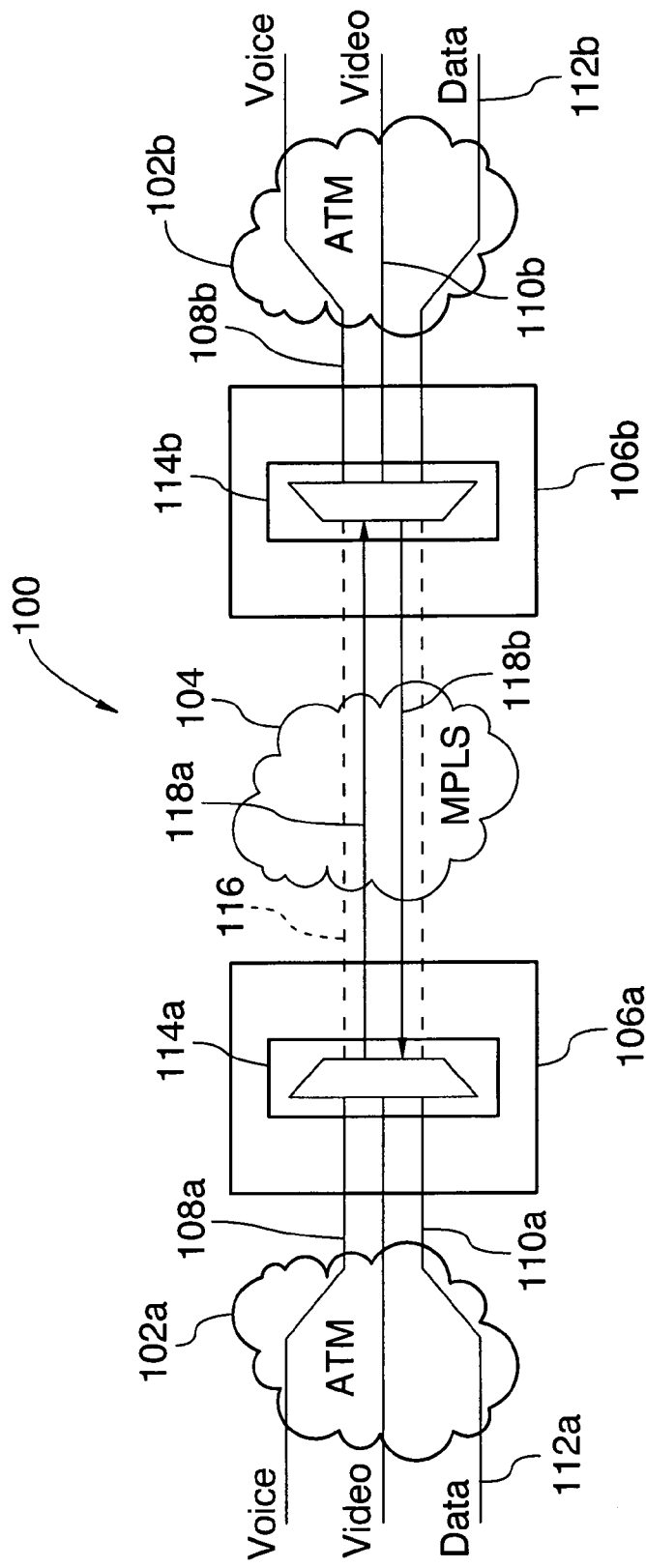
FIG. 1B is a block diagram showing further details of the edge switches in the heterogeneous network of FIG. 1A.

The following is a brief description of an illustrative heterogeneous network in which the present invention may be practised. In FIGS. 1A and 1B, a heterogeneous network 100 is shown comprising a first ATM network 102a, a second ATM network 102b and an intermediary network 104. As shown, gateway 106a connects ATM network 102a to the intermediary network 104, and the intermediary network 104 is in turn connected to ATM network 102b through gateway 106b. While shown as network clouds in FIG. 1A, it will be appreciated that each ATM network 102a, 102b may comprise a plurality of interconnected ATM switches connected by communication links.

For the purpose of illustration, the intermediary network 104 is shown as comprising an MPLS network. MPLS networks allow the creation of dedicated "tunnels" or routing paths through the network. Accordingly, the tunnels allow the provisioning of Virtual Private Network ("VPN") services across the MPLS network 104. However, it will be appreciated that other types of packet based networks can be used which can interface with the ATM network.

Still referring to FIGS. 1A and 1B, the edge switches 106a, 106b serve as ATM/MPLS a mediation gateways which convert ATM cells to MPLS traffic, and vice versa, for traffic originating from ATM network 102a and traversing through MPLS network 104. The MPLS network or core 104 may include a plurality of intermediary switches (not shown) which define a traffic "tunnel" 116 though the MPLS core 104, as explained further below with reference to FIG. 2. It will be appreciated that the term "MPLS tunnel" is interchangeable with the term "MPLS routing path".

As shown in FIG. 1B, various types of traffic may be routed from ATM network 102a through the MPLS core 104 to ATM network 102b including voice traffic 108a, 108b, video traffic 110a, 110b, and data traffic 112a, 112b.

Figure 2:
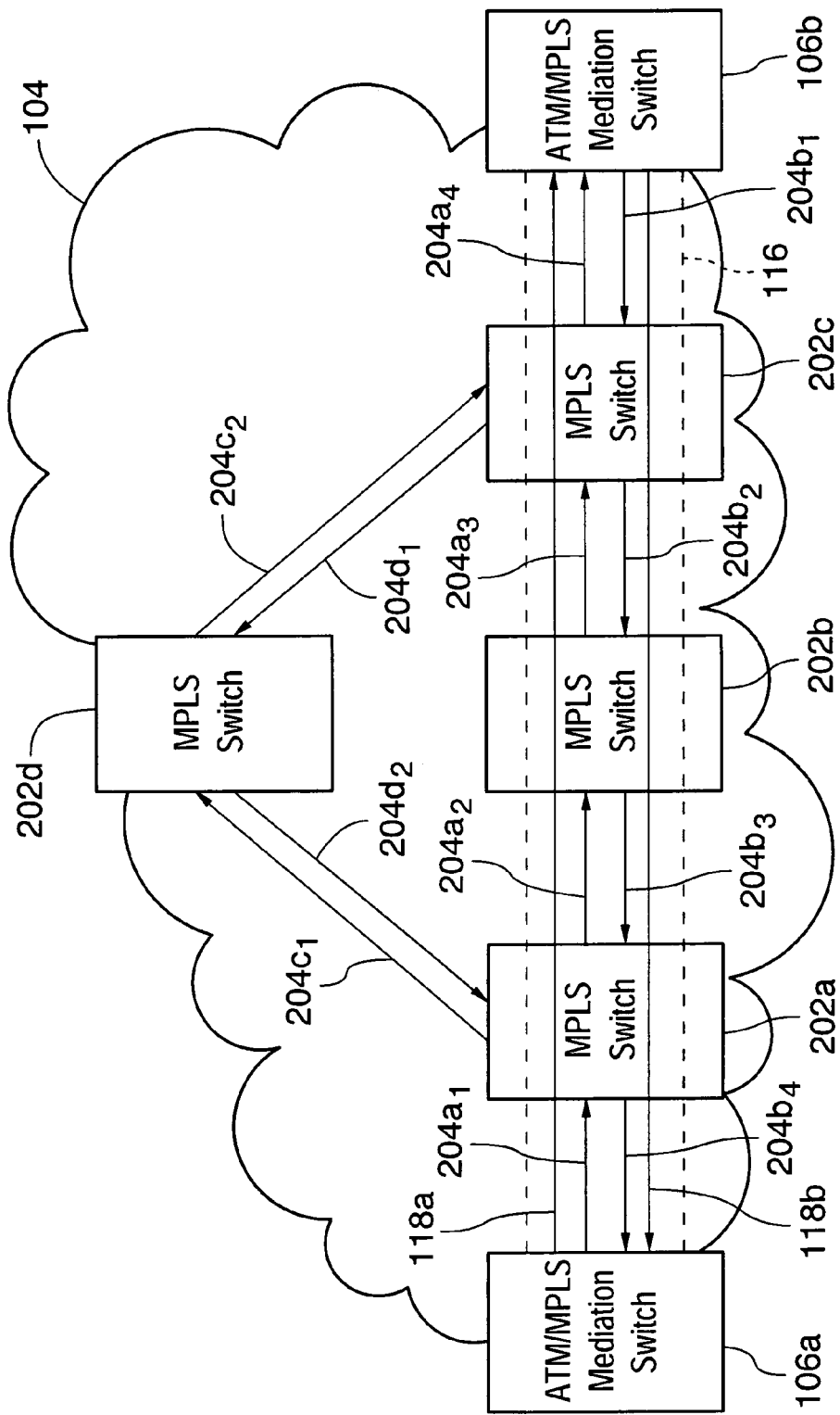
FIG. 2 is a block diagram showing further details of the MPLS network of FIG. 1A.

Now referring to FIG. 2, shown is a more detailed view of the routing path or tunnel 116 established through the MPLS network 104. At a first end of the tunnel 116 is an ATM/MPLS mediation gateway 106a (also, FIGS. 1A and 1B). At a second of the tunnel 116 is another ATM/MPLS mediation gateway 106b (also, FIGS. 1A and 1B). Between the ATM/MPLS mediation gateways 106a, 106b are a series of connected intermediary MPLS switches 202a, 202b, 202c which form a part of the tunnel 116. Each intermediary MPLS switch 202a, 202b, 202c routes MPLS traffic between ATM/MPLS mediation gateways 106a, 106b through connections $204a_1 \ldots 204a_4$, and $204b_1 \ldots 204b_4$. The connections $204a_1 \ldots 204a_4$, and $204b_1 \ldots 204b_4$ may comprise, for example, fibre optic cables carrying unidirectional data between the ATM/MPLS mediation gateways 106a, 106b, through MPLS switches 202a, 202b and 202c.

ATM/MPLS Format Conversion

It will be appreciated that the ATM/MPLS mediation gateways 106a, 106b must translate ATM cells to MPLS packets and vice versa. For discussion purposes, the format of an ATM cell and an MPLS frame is now described.

Figure 3:
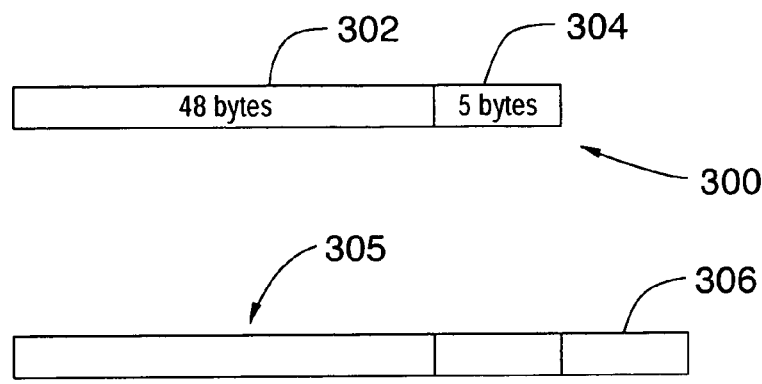
FIG. 3 is a block diagram showing an exemplary ATM cell and an internal cell format which may be processed by the switches shown in FIGS. 1A and 1B.

Now referring to FIG. 3, as known in the art, an ATM cell 300 comprises 48 bytes of data in data field 302 and five bytes of header data in header field 304. The header field 304 includes data relating to error checks and destination information as is known in the art. For each of the ATM cells 300, the data and header information must be transposed into an MPLS frame. The ATM cells 300 may be converted into an internal cell format 305 for processing within the ATM/MPLS mediation gateways 106a, 106b. As shown, the internal cell format 305 has an additional header 306.

Figure 4:
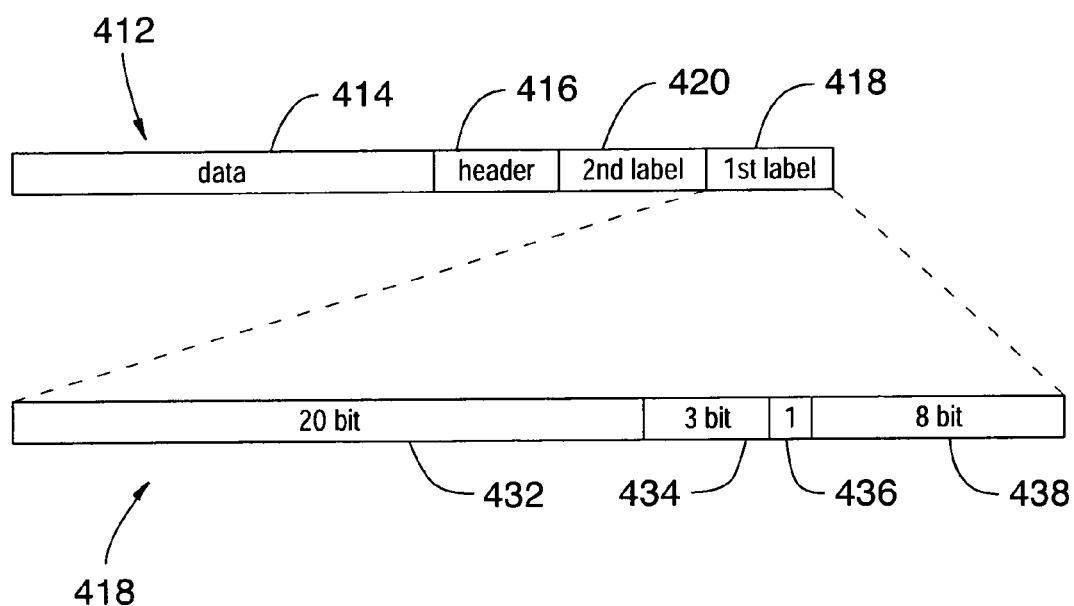
FIG. 4 is a block diagram showing an exemplary MPLS frame and associated MPLS label which may be processed by the switches shown in FIGS. 1A and 1B.

Now referring to FIG. 4, an MPLS frame 412 is shown comprising a data field 414, header field 416, a first or outer label field 418 and a second or inner label field 420. When converting an ATM cell 300 to a MPLS frame 412, the ATM data field 302 is inserted into the MPLS data field 414. Similarly, the contents of the respective ATM cell header field 304 is inserted into the MPLS header field 416. In practice, the header field 416 is a component of data field 414.

The contents of the first or outer label 418 provides routing information for the MPLS frame 412 through MPLS network 104. First label field 418 contains identification information relating to the MPLS routing path for the MPLS frame 412. For example this first label field 418 may contain information relating to the MPLS tunnel 116 described above with reference to FIG. 2. The second label field 420 of MPLS frame 412 identifies the port, shelf, slot, vpi and vci information for the switch 106b.

As noted above, MPLS labels are the routing mechanism used in the MPLS network 104 to identify then traverse tunnel 116. In the present embodiment, the outer MPLS label 418 may have the format shown in FIG. 4. That is, the outer MPLS label 418 may be a 32-bit label comprising a 20-bit label field 432, a 3-bit EXP field 434 (an experimental field giving the class of service of the LSP), a 1-bit stack field 436, and an 8-bit time-to-live ("TTL") field 438. The label field 432 contains the actual value of the MPLS label 418. The EXP field 434 carries Class of Service or COS information that can affect the queueing and discarding of algorithms applied to a packet carrying the label 418. A label distribution scheme, which may be manual, is used to distribute the MPLS label 418 to relevant peers in the MPLS network 104.

Each of the intermediary MPLS switches 202a, 202b, 202c is an MPLS label switched router ("LSR") which processes the MPLS labels 418 of MPLS frames 412 being sent through the MPLS network 104. By way of illustration, a fourth MPLS switch 202d is shown connected to MPLS switches 202a and 202c by links $204c_1$, $204c_2$, $204d_1$ and $204d_2$. However, MPLS switch 202d does not form a part of the tunnel 116 as defined by an MPLS label 418. It will be appreciated that, given a different MPLS label 418, MPLS switch 202d may form a part of an alternative MPLS tunnel comprising MPLS switches 202a, 202d, and 202c.

Referring back to FIG. 2, in the illustrative example, the intermediary switches 202a, 202b, 202c in the tunnel 116 comprise a label switch path ("LSP") in the MPLS network 104. Upon being established, the MPLS network 104 reserves the necessary resources to meet the service requirements defined by the LSP. However, given limited line bandwidth resources, how those resources are reserved and managed will be an important factor in determining the overall performance of the heterogeneous network 100. More specifically, how effectively COS information for individual connections are used to manage traffic between ATM and MPLS networks may determine how well limited bandwidth resources are used.

Figure 5:
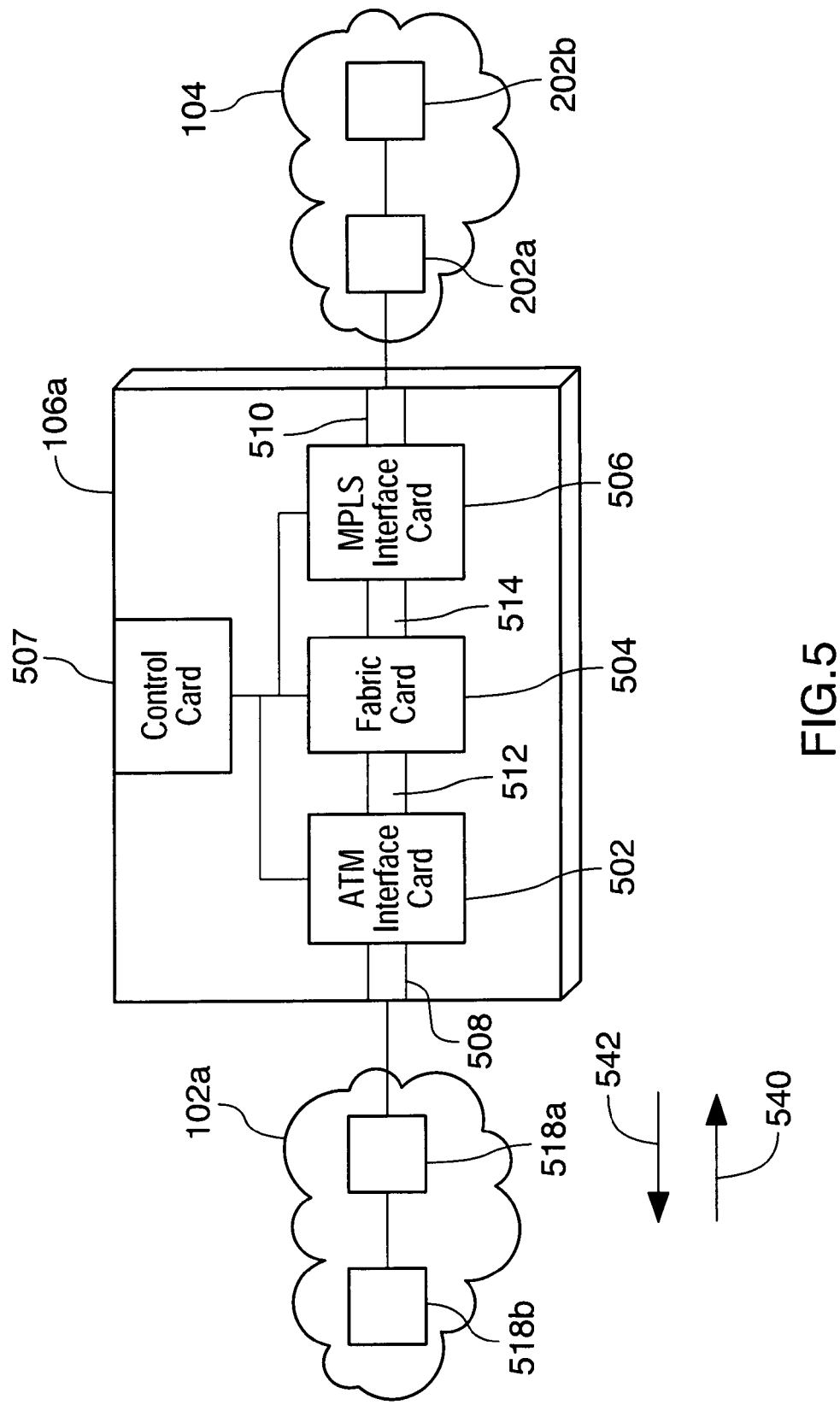
FIG. 5 is a block diagram showing further physical details of the switch in the heterogeneous network of FIGS. 1A and 1B.

Now referring to FIG. 5, in a physical embodiment, ATM/MPLS mediation gateway 106a may comprise an ATM interface card 502, a fabric card 504, an MLPS interface card 506, at least one ATM port 508, at least one MPLS port 510, two fabric ports 512 and 514, and a control card 507. One or more I/O cards (not shown) also form part of the ATM/MPLS mediation gateway 106a.

ATM/MPLS mediation gateway 106 a interfaces a first ATM network 102a comprising a plurality of ATM switches 518a, 518b with an MPLS network 104 comprising a plurality of MPLS switches 202a, 202b. As shown, the gateway 106a has an ATM card 502 for interfacing with ATM network 102a and a MPLS card 506 for interfacing with the MPLS network 104. ATM network 102a connects to ATM card 502 of ATM/MPLS mediation gateway 106a through ATM port 508 and an input/output (I/O) card (not shown). MPLS network 104 connects to MPLS card 506 through MPLS port 510 and an I/O card (not shown). Inside ATM/MPLS mediation gateway 106a, ATM card 502 connects to fabric card 504 through fabric port 512 and fabric card 504 connects to MPLS card 506 through fabric port 514.

For traffic from ATM network 102 a destined for MPLS network 104 traversing in direction 540, ATM card 502 receives ATM cells 300. Between the ATM card 502 and the MPLS card 506, a special internal cell format 305 (FIG. 3) is used having an additional header 306 which includes information used by fabric card 504 to transmit the content of ATM cells 300 to the appropriate MPLS card 506. MPLS card 506 removes the additional header 306 and converts the ATM cells 300 received from the fabric card 504 into MPLS frames 412 by adding labels 418, 420 (FIG. 4). The MPLS frames 412 are then transmitted over MPLS network 104 to their destination as established by MPLS labels 418 of the MPLS frames 412.

For traffic from MPLS network 104 destined for ATM network 102a traversing in direction 542, MPLS card 506 receives MPLS frames 412 transmitted from MPLS network 104 and converts them into the internal cell format 305 utilized by fabric card 504 by stripping off the labels 418, 420 and adding the additional header 306. Fabric card 504 uses information in the additional header 306 to transmit these MPLS frames 412 to the ATM card 502. ATM card 502 converts the internal cells 305 into ATM cells 300 by stripping off the internal header 306 as described above and transmits them over ATM network 102 a to their destination.

In an embodiment, the additional header 306 of the internal cell format 305 contains an identifier to a connection information ("CI") data element. A CI data element is created when each connection in the network is configured by a user, and distributed to the ATM card 502 and the MPLS card 506 by the control card 507. The CI data element contains a field having a unique identification value for the connection and several fields containing QoS parameters for the connection, including fields having values for the Service Category of the connection. Thus, the CI provides extra context information which may be used to uniquely identify each individual endpoint during mediation in the MPLS network. In operation, the MPLS card 506 reads the CI data element in the additional header 306 to determine which egress queue a particular ATM cell 300 should be directed to.

As will be appreciated, the particular hardware implementation will be specific to the type of conversion required between the networks, and other embodiments are possible, including multi-shelf configurations.

Figure 6:
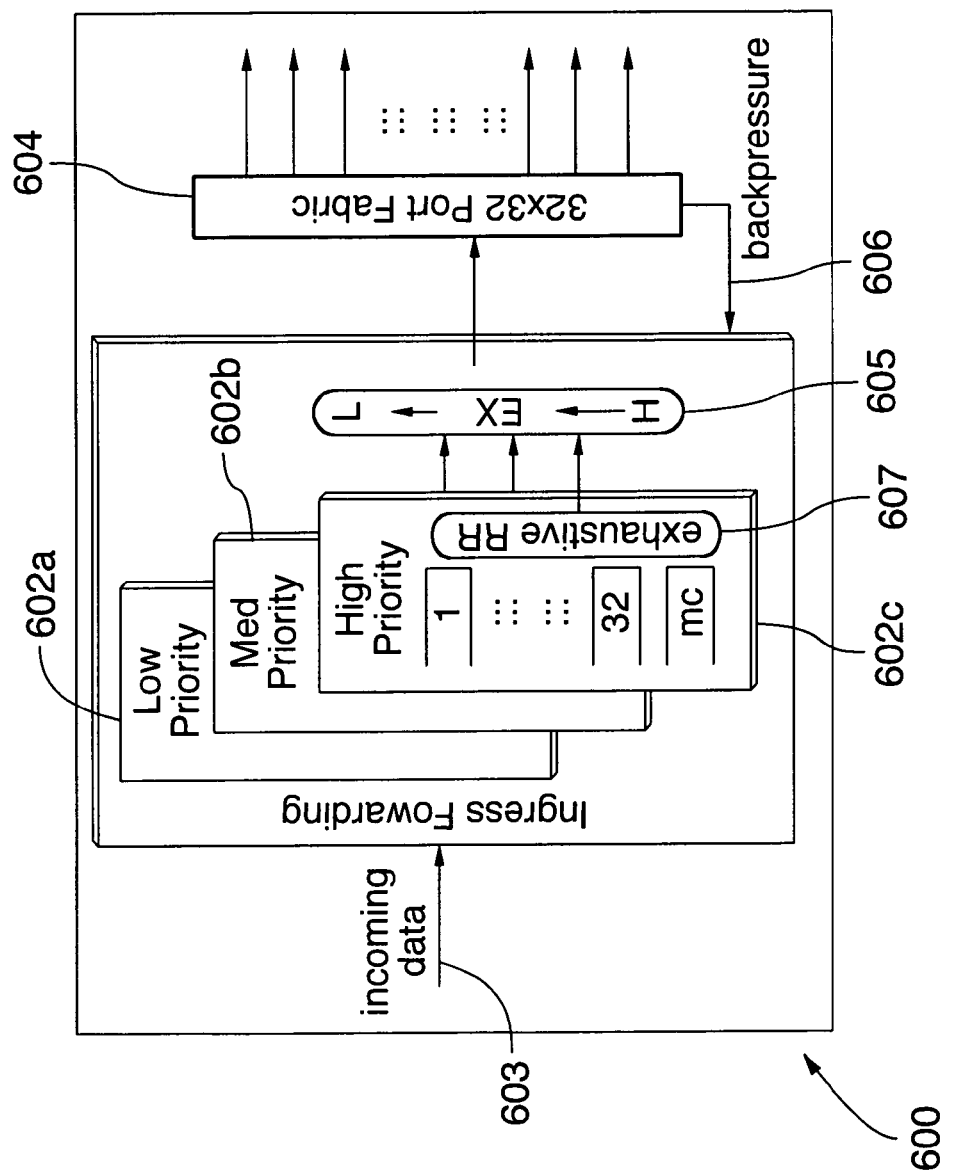
FIG. 6 is a block diagram of an ingress queueing system inside the switch of FIG. 5.

Now referring to FIG. 6, shown and described is an ingress (i.e. ingress in direction 542 from the ATM network to the MPLS network) queueing and buffer management system 600 found within the ATM/MPLS mediation gateway 106 a, on the ATM interface card 502 (FIG. 5). A similar queuing and buffer management system may be used for traffic flowing in the opposite direction 540 in the MPLS interface card 506.

By way of example, the buffer management system 600 may comprise a number of partitions 602a, 602b, 602c (low priority, medium priority and high priority, respectively) which are used to partition ingress traffic based on ATM QoS parameters listed in the ATM header of incoming ATM cells 603. By way of example, the three priority categories 602a, 602b, 602c may be used to buffer ATM traffic according to the following Table A:

TABLE A

| Priority Partition | Traffic Type |
| --- | --- |
| high | constant bit rate ("CBR") and real-time variable bit rate ("rtVBR") service categories |
| medium | non-real-time variable bit rate ("nrtVBR") service category |
| low | Available bit rate ("ABR") and unspecified bit rate ("UBR") service categories |

While more partitions and a different breakdown of traffic types are possible, the breakdown shown above in Table A has been found by the inventors to be sufficient for the purposes of partitioning and buffering ingress traffic from an ATM network into an MPLS network. However, the three priority partitions have been found to provide insufficient resolution for the purpose of determining priorities for egress traffic, as explained further below.

Still referring to FIG. 6, in the embodiment, there are 32 virtual output queues ("VOQs") and a multicast queue in each of the priority partitions 602a, 602b, 602c. In FIG. 6, the 32 VOQs in the high priority partition 602c are shown. Each VOQ is used to queue traffic having the same destination in switch 106a. For example, point-to-point traffic in a multi-shelf system destined for fabric port 32 of the 32×32 port fabric 604 may be provided to queue 32. There may also be a single diagnostic queue in each partition 602a, 602b, 602c. Similarly, diagnostic traffic will be placed in the diagnostic queue, and multicast traffic will be placed in the multicast queue. An internal exhaustive round robin queue 607 selects one of the VOQs for service. Amongst the partitions 602a, 602b, 602c, exhaustive priority scheduler 605 selects one of the partitions for service to the port fabric 604.

In an embodiment, when port fabric 604 becomes congested, it may apply "back-pressure" signal 606 to a VOQ on ingress cards of a specific priority. In this event, a line card will buffer or discard data destined for the back-pressured fabric port 604 until the fabric congestion has cleared.

From fabric 604, traffic destined to MPLS network 104 is forwarded to MPLS card 506. It will be appreciated that traffic from all ingress cards 502 with flows to MPLS card 506 may make fabric switch card 604 a congestion point. As noted earlier, prior art systems provided a back-pressure signalling scheme to alleviate congestion and a prioritization scheme for converting providing numerous COS levels. In a back-pressure only situation, traffic streams that are not behaving will unfairly penalize those streams that are behaving.

Thus, the present embodiment provides a managed multiple priority queue system at the egress point of switch 106a to alleviate congestion. More specifically, the arrangement of the priority queues is organized around a COS which is determined for each traffic stream. This provides the ability to only penalize those traffic streams that are not behaving.

In the embodiment, the following conversion table, Table B, is used to translate ATM service categories and values or ranges of certain ATM QoS parameters to a system-wide COS.

TABLE B

| Service Category (SC) | CLR | CDV | COS |
| --- | --- | --- | --- |
| CBR | don't care | don't care | 1 |
| rtVBR1 | | 250 <= CDV < 2500 | 1 |
| rtVBR2 | | 2500 <= CDV <= 10000 | 2 |
| nrtVBR1 | $10^{-7}$ (1 of every $10^7$ cells is lost) | don't care | 3 |
| nrtVBR2 | $10^{-6}$ | | 4 |
| nrtVBR3 | $10^{-5}$ | | 5 |
| nrtVBR | $10^{-1}$ to $10^{-4}$ | | 6 |
| ABR | don't care | | 7 |
| UBR | | | 8 |

The above conversion table is just one possible conversion scheme based on values or ranges of the QoS parameters CLR and CDV. It will be appreciated that a different number of COS may be used and the conversion may be based on other ATM QoS parameters.

Figure 7:
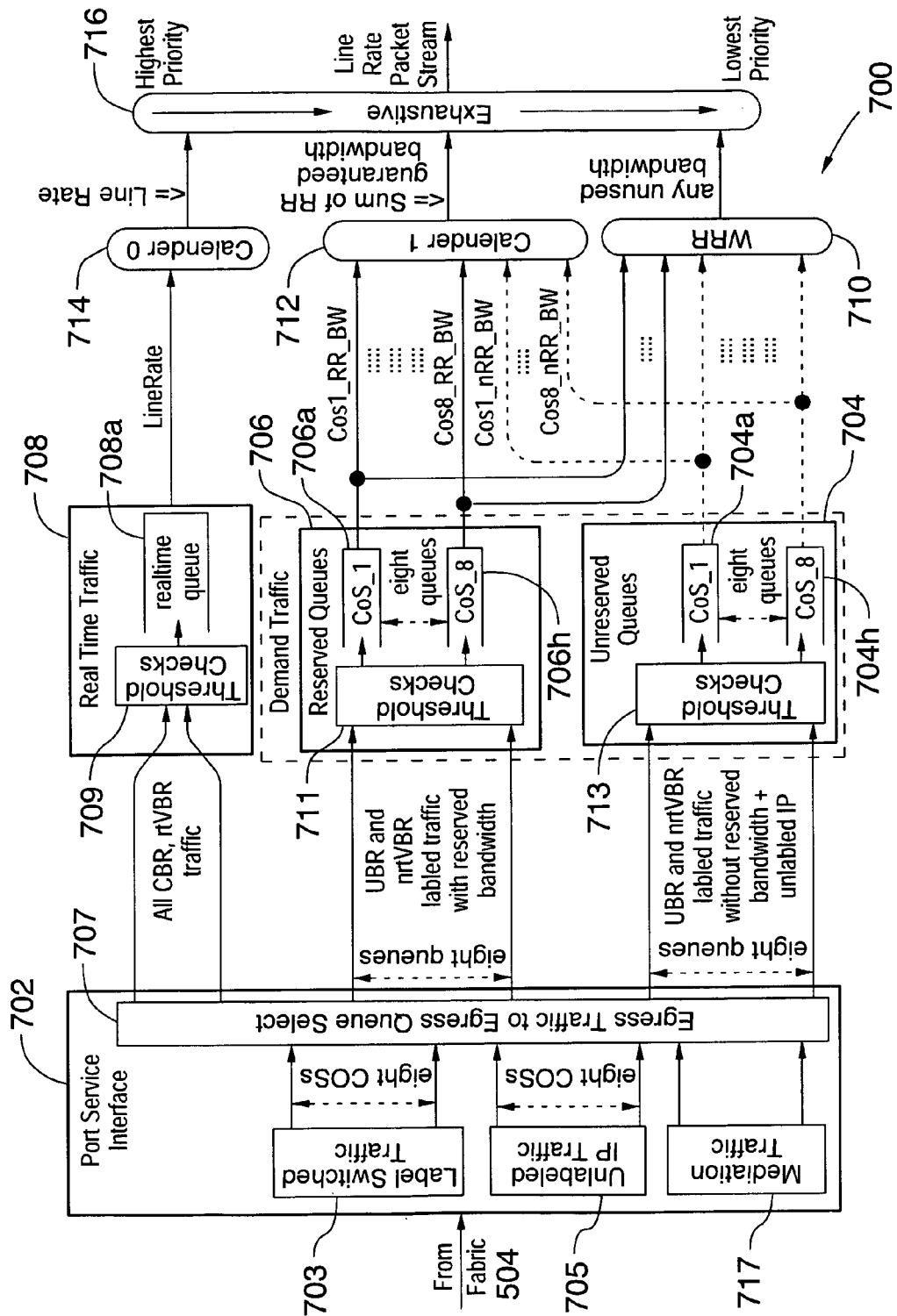
FIG. 7 is a block diagram of an egress scheduling and arbitration system according to an embodiment, as found inside the switch of FIG. 5.

Now referring to FIG. 7, shown and described is a system 700 for scheduling and arbitration of MPLS traffic according to an embodiment. The system 700 comprises a port service interface 702, unreserved egress queues 704, reserved egress queues 706, and a real-time traffic egress queue 708.

As shown in FIG. 7, the port service interface 702 may be capable of simultaneously processing MPLS label switched traffic 703, unlabelled IP traffic 705, and mediation traffic from numerous other connections. The label switched traffic 703 may provide eight classes of service or COS as established by the conversion shown in Table B, above. The unlabelled traffic may provide a further eight classes of service. Each of the COS may have a weighting which affects their access priority to available unused bandwidth. For example, a heavier weighting may allow greater access to available unused bandwidth based on a relative percentage of the total sum of the weightings. As shown in FIG. 7, the port service interface 702 directs label switched traffic 703, unlabelled IP traffic 705, and mediation traffic 717 to an appropriate egress queue at block 707. The egress queues 704, 706, 708 receive certain classes of traffic from the port service interface 702, according to Table C, below.

TABLE C

| Egress Queue | Traffic Type | Rate Limit |
|---|---|---|
| real-time traffic | all CBR, rtVBR traffic | rate = line rate |
| reserved queues | UBR and nrtVBR labelled traffic and with reserved bandwidth, and some mediation traffic | MIR < rate < line rate |
| unreserved queues | UBR and nrtVBR labelled traffic without reserved bandwidth, unlabelled IP, and some mediation traffic | rate = any unused bandwidth, or minimum bandwidth |

Still referring to FIG. 7, and as shown in Table C, all CBR and rtVBR traffic is placed into a real-time queue 708a after undergoing threshold checks at block 709. The threshold checks may include, for example, a check to determine whether the queue is full, and whether the minimum queue depth has been exceeded. Thus, CBR and rtVBR traffic is given priority over other traffic and is sent at a rate limit equal to the line rate through calendar 714 in a line rate packet stream 716. This results in low latency and low delay for traffic processed by the real-time queue 708a.

In the embodiment shown in FIG. 7, UBR and nrtVBR labelled traffic is provided a reserved amount of port bandwidth to the reserved queues 706. Eight reserved queues 706a ... 706h receive UBR and nrtVBR labelled traffic with reserved bandwidth after threshold checks at block 711. The threshold checks performed at block 711 may include comparing the UBR and nrtVBR reserved queue depths to predetermined thresholds. Weighted random early discard may be applied to packets in these queues if their queue depths reach a minimum level. Traffic in the queues 706a ... 706h is then processed on a best effort basis with guaranteed bandwidth for each queue and consideration for whether any random early discard should occur. As shown, each reserved bandwidth queue 706a ... 706h is processed by calendar 712 and enters the line rate packet stream at 716. It will be appreciated that the bandwidth processed by calendar 712 will be less than or equal to the sum of the reserved bandwidths of the reserved bandwidth queues 706a ... 706h.

Moreover, traffic from each reserved bandwidth queue may be processed through weighted round robin ("WRR") scheduler 710 if there is any remaining unused bandwidth in the line rate packet stream 716 after all minimum bandwidth guarantees have been met. As noted above, each of the reserved queues 706a ... 706h may be given a weighting to prioritize access to available unused bandwidth thorough WRR 710.

Unreserved queues 704 also comprise eight queues 704a ... 704h having eight classes of service. These unreserved queues 704a ... 704h receive UBR and nrtVBR labelled traffic without reserved bandwidth, and any unlabelled IP traffic after threshold checks at block 713. Threshold checks performed at block 713 are similar to checks performed at blocks 709 and 711, above, including checking the queue depths and applying random early discard to the queues if they reach a minimum level.

In one embodiment, no bandwidth guarantees are provided. Rather, traffic at each unreserved queue 704a ... 704h is processed by WRR 710 only if there is any unused bandwidth remaining in the line rate packet stream 716 after real-time traffic and reserved queue traffic has been processed. Furthermore, if any reserved bandwidth queues are not being used to capacity at any given point in time, calendar 712 may be used to schedule traffic from the unreserved queues 704a ... 704h. However, it will be appreciated that any reserved traffic will be given priority upon arrival at calendar 712. Once queued, however, a packet will be transmitted.

In another embodiment, the unreserved queues 704 may be given a minimum amount of guaranteed bandwidth so that some traffic is able to be processed through the unreserved queues even when the system 700 is congested.

EXAMPLE

Figure 8A:
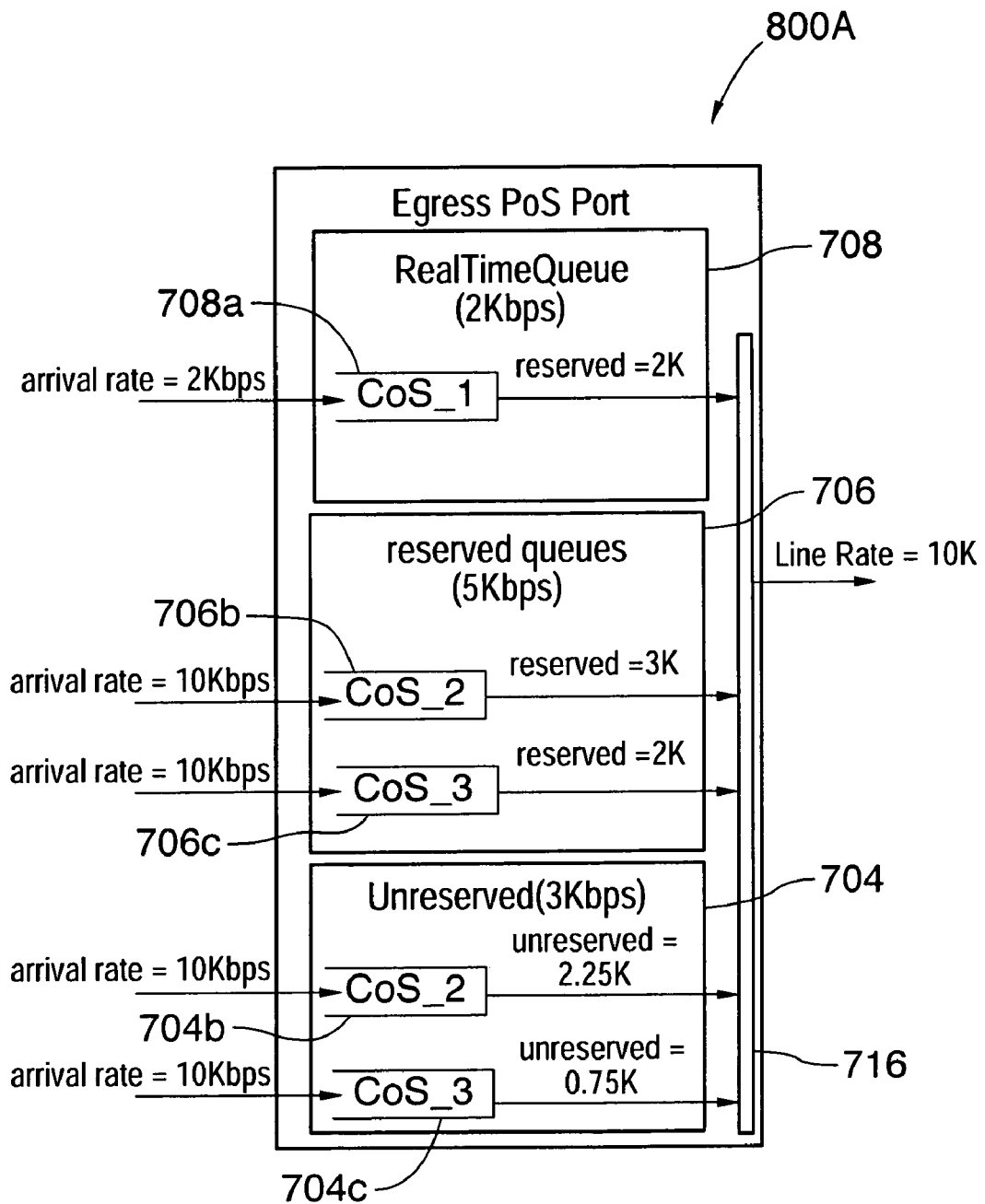
FIG. 8A is an example of a queuing congestion scenario on the switch of FIG. 5.

As shown in FIG. 8A, an example of a congestion scenario is now provided to illustrate operation of the system 700 where the system 700 allocates port bandwidth between the different types of egress queues 704, 706, 708 described above. In the scenario summarized in Table D, below, a total port bandwidth of 10 Kbps is considered, although this value is illustrative only and not considered to be limiting. It will be appreciated that the bandwidth will be limited only by the limitations of the particular hardware embodiment used to practice the present invention.

In this example, the unreserved queues 704 have been given a minimum guaranteed bandwidth of 3 Kbps.

TABLE D

| COS | Service Category | COS Weight | Reserved queue (5 Kbps guaranteed bandwidth) | Unreserved queue (3 Kbps guaranteed bandwidth) |
|---|---|---|---|---|
| 1 | CBR | n/a | 2K | n/a |
| 2 | nrtVBR | 6 | 3K | 3K × 6/8 = 2.25K |
| 3 | UBR | 2 | 2K | 3K × 2/8 = 0.75K |
| 4 to 8 | UBR | 0 | 0 | 0 |
| Σ all COS | | 8 | 7K | 3K |

In the example shown in FIG. 8A and summarized above in Table D, the real-time queue 708 is receiving traffic at a constant arrival rate of 2 Kbps. Based on the rate limit for each as described above in Table C, the real-time queue receives a reserved bandwidth of 2 Kbps.

Still referring to FIG. 8A, each of reserved queues 706b and 706c are receiving traffic at a steady arrival rate of 10 Kbps. and assuming that the reserved queues 706b and 706c have reserved bandwidths of 3 Kbps and 2 Kbps, respectively, the reserved queue 706 will receive a total bandwidth of 5 Kbps through line rate packet stream 716.

Assuming that each of unreserved queues 704b and 704c are receiving traffic at a steady arrival rate of 10 Kbps, and that the unreserved queues have a guaranteed bandwidth of 3 Kbps, the unreserved queues 704b, 704c will share the 3 Kbps bandwidth proportionately, based on their COS weight shown in Table D, above. That is, unreserved queue 704b will receive a bandwidth of 3 Kbps×6/8=2.25 Kbps, and unreserved queue 704c will receive a bandwidth of 3 Kbps×2/8=0.75 Kbps. It will be appreciated that proportional use of bandwidth may be extended to a larger number of queues with appropriate changes in points of detail.

Thus, in summary, it can be seen that both the real-time and unreserved queues 708 and 706 are given their guaranteed bandwidth, and that the remaining unreserved bandwidth is shared in a fair, prioritized manner amongst the active queues.

Referring back to FIGS. 1A and 1B, it will be appreciated that data traffic converted from ATM cells or frames to MPLS frames may be converted back again once the MPLS frames reach their destination at ATM/MPLS mediation gateway 106b. Referring back to FIGS. 3 and 4, the MPLS frame 412 carries all of the information necessary to convert the MPLS frame 412 back into the original ATM cell 300 or frame 306. At the destination point, the first and second MPLS labels 418, 420 have served their purpose and may be stripped away in the conversion process back to ATM cells 300 and frames 306. However, the system-wide COS information necessary to identify the service class is configured and transferred to the new ATM cell 300 or frame 306 in the conversion process. It will be appreciated that the COS information may be used by the second ATM/MPLS gateway 106b for further processing of the ATM cells 300 and frames 306 on the other side of the ATM/MPLS gateway 106b (not shown). For example, other packet based networks may be connected to the other side of the ATM/MPLS gateway 106 and may make use of the COS information determined as described above.

Figure 8B:
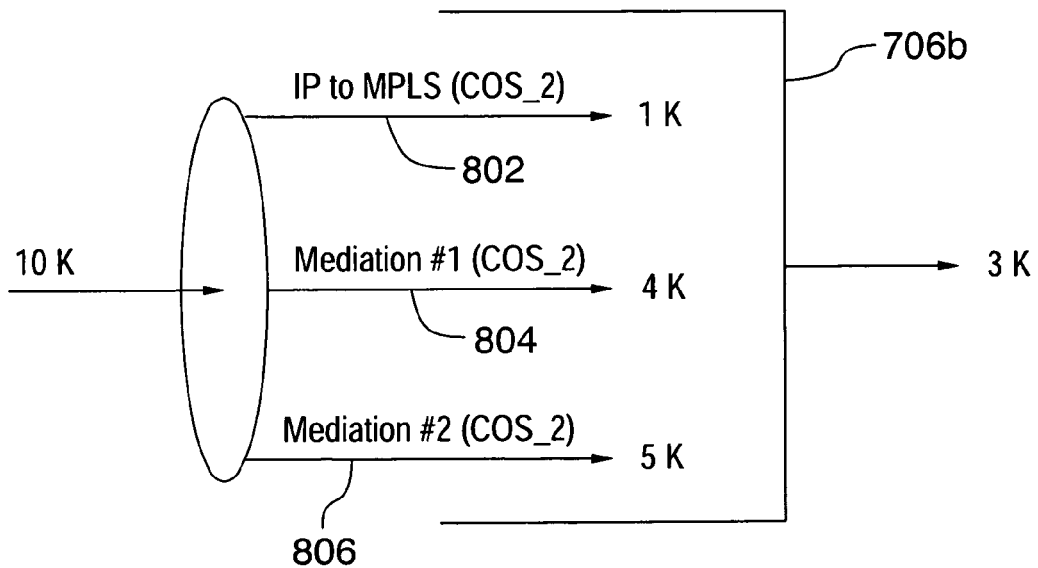
FIG. 8B is a more detailed view of one of the reserved queues of FIG. 8A.

Referring to FIG. 8B, in another example, shown is a more detailed view of one of the reserved queues 706b of FIG. 8A. As shown, traffic flows to a queue may actually comprise different types of traffic flows including, for example, IP to MPLS traffic flow 802 with arrival rate of 1K, a first mediation traffic flow 804 with an arrival rate of 4K, and a second mediation traffic flow 806 with an arrival rate of 5K. Each of these different traffic flows 802, 804, 806 have in common an association with COS_2 and have resources reserved. It will be appreciated that queues 708a, 706c, 704b, and 704c of FIG. 8A may similarly have different types of traffic flows.

Figure 9:
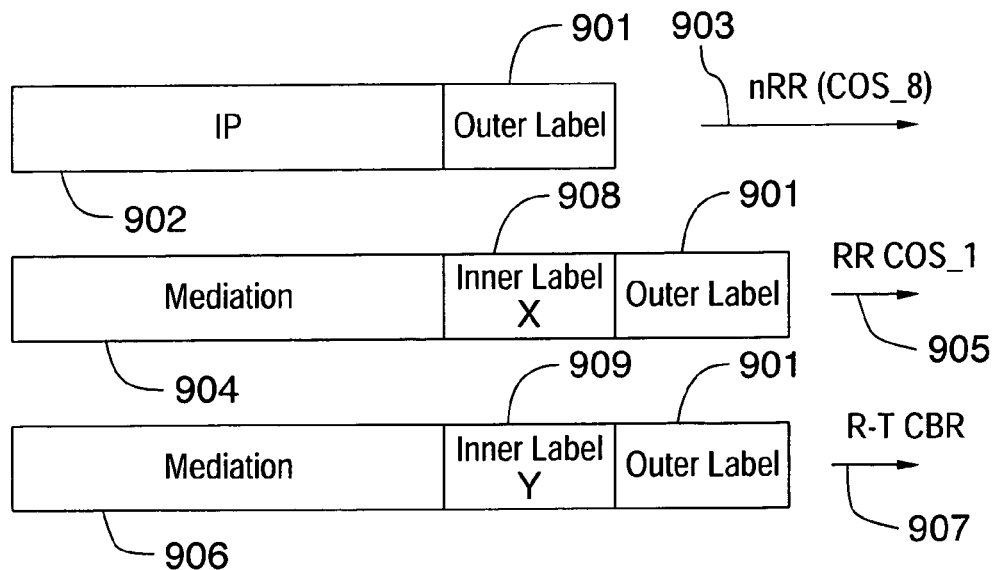
FIG. 9 is an example of different types of cells having the same outer labels but being directed to different queues.

Finally, referring to FIG. 9, shown is an example of traffic cells including an IP cell 902, a mediation cell 904, and another mediation cell 906. These cells 902, 904, 906 may have the same outer label 901, for example, but will be directed to different egress queueing/scheduling 903, 905, 907 based on their respective traffic parameters and types of traffic flow.

It is noted that those skilled in the art will appreciate that various modifications of detail may be made to the present embodiment, all of which would come within the scope of the invention.

We claim:

1. A method of mediating cell traffic between an asynchronous transmission mode (ATM) network and an adjacent network, each cell in said cell traffic having a set of transmission parameters related to said ATM network and a respective ATM connection for said cell, said method comprising:
   (i) identifying for said cell an egress queue family by utilizing a first set of parameters from said set of transmission parameters;
   (ii) associating with said cell one of a predefined number of egress class of service (COS) levels by mapping a second set of parameters from said set of transmission parameters into one of said egress COS levels;
   (iii) utilizing said egress COS level associated with said cell to select an egress queue member of said egress queue family identified in step (i), said selected egress queue member being associated with said egress COS level associated with said cell in step (ii); and
   (iv) providing said cell to said identified queue member for forwarding to said another network;
   wherein said first set of parameters comprises a real-time connection indication and a resource reserved indication;
   wherein said second set of parameters comprises at least an ATM quality of service parameter and a service category parameter;
   wherein for said second set of parameters, said ATM quality of service parameter comprises a cell loss ratio parameter and a cell delay variation parameter;
   wherein said egress queue family in step (i) is one of a real-time (R-T) queue family, a resources reserved (RR) queue family, and a non-resources reserved (nRR) queue family; and,
   wherein said RR queue family comprises eight RR queue members, each said RR queue member having a minimum bandwidth proportional to a weight assigned to each egress COS level associated with each said RR queue.

2. A method as claimed in claim 1, wherein said R-T queue family comprises a single R-T queue member having a predefined minimum bandwidth.

3. A method as claimed in claim 1, wherein said non-resources reserved queue family comprises eight nRR queue members, each said nRR queue member having a relative queue priority corresponding to an egress COS level associated with each said nRR queue.

4. A system for mediating cell traffic between an asynchronous transmission made (ATM) network and an adjacent network, each cell in said cell traffic having a set of transmission parameters related to said ATM network and a respective ATM connection for said cell, said system comprising:
   (a) an identifier for utilizing a first set of parameters from said set of transmission parameters to identify an egress queue family for said cell;
   (b) a translator for translating a second set of parameters from said set of transmission parameters to an egress class of service (COS) level associated with said cell; and
   (c) a selector for selecting an egress queue member of said egress queue family to forward said cell to said another network, said selected egress queue member being associated with said egress COS level associated with said cell;
   wherein said first set of parameters comprises a real-time connection indication and a resource reserved indication;
   wherein said second set of parameters comprises at least an ATM quality of service parameter and a service category parameter;
   wherein for said second set of parameters, said ATM quality of service parameter comprises a cell loss ratio parameter and a cell delay variation parameter;
   wherein said egress queue family is one of a real-time (R-T) queue family, a resources reserved (RR) queue family, and a non-resources reserved (nRR) queue family; and,
   wherein said RR queue family comprises eight RR queue members, each said RR queue member having a minimum bandwidth proportional to a weight assigned to each egress COS level associated with each said RR queue.

5. A system as claimed in claim 4, wherein said R-T queue family comprises a single R-T queue member having a predefined minimum bandwidth.

6. A system as claimed in claim 4, wherein said non-resources reserved queue family comprises eight nRR queue members, each said nRR queue member having a relative queue priority corresponding to an egress COS level associated with each said nRR queue.

7. A method of mediating cell traffic between an asynchronous transmission mode (ATM) network and an adjacent network, each cell in said cell traffic having a set of transmission parameters related to a respective ATM connection, said method comprising:
(i) identifying for said cell a set of parameters associated with said set of transmission parameters and switching said cell according to said set of parameters;
(ii) associating with each parameter of said set of parameters, a class of service (COS) level from a predefined number of class of service (COS) levels;
(iii) inserting said cell into a packet adapted for routing on said adjacent network and associating said packet with an egress COS level, according to said set of parameters of said cell; and
(iv) utilizing said egress COS level associated with said packet to select an egress queue member of an egress queue family and placing said packet into said egress queue member for transmission along said adjacent network.

8. A method as claimed in claim 7, wherein said set of transmission parameters comprises a real-time connection indication and a resource reserved indication.

9. A method as claimed in claim 7, wherein said set of parameters comprises at least an ATM quality of service parameter and a service category parameter.

10. A method as claimed in claim 9, wherein said service category parameter comprises a cell loss ratio and a cell delay variation.

11. A method as claimed in claim 10, wherein said egress queue family is one of a real-time (R-T) queue family, a resources reserved (RR) queue family, and a non-resources reserved (nRR) queue family.

12. A method as claimed in claim 11, wherein said R-T queue family comprises a single R-T queue member having a predefined minimum bandwidth.

13. A method as claimed in claim 11, wherein said RR queue family comprises eight RR queue members, each said RR queue member having a minimum bandwidth proportional to a weight assigned to each egress COS level associated with each said RR queue.

14. A method as claimed in claim 11, wherein said non-resources reserved queue family comprises eight nRR queue members, each said nRR queue member having a relative queue priority corresponding to an egress COS level associated with each said nRR queue.

15. A method as claimed in claim 7, wherein said egress COS level is mapped within a field of an outer label of said packet.

16. A system for mediating cell traffic between an asynchronous transmission mode (ATM) network and an adjacent network, each cell in said cell traffic having a set of transmission parameters related to said ATM network and a respective ATM connection for said cell, said system comprising:
(a) an identifier for utilizing a set of parameters associated with said set of transmission parameters;
(b) a translator for translating said set of parameters from said set of transmission parameters to an egress class of service (COS) level;
(c) means for inserting said cell into a packet adapted for routing on said adjacent network and associating said packet with an egress COS level, according to said set of parameters of said cell; and
(d) a port service interface for selecting an egress queue member to forward said packet to said adjacent network, said selected egress queue member being associated with said egress COS level associated with said set of parameters of said cell.

17. A system as claimed in claim 16, wherein said set of transmission parameters comprises a real-time connection indication and a resource reserved indication.

18. A system as claimed in claim 16, wherein said set of parameters comprises at least an ATM quality of service parameter and a service category parameter.

19. A system as claimed in claim 18, wherein said service category parameter comprises a cell loss ratio and a cell delay variation.

20. A system as claimed in claim 19, wherein said egress queue family is one of a real-time (R-T) queue family, a resources reserved (RR) queue family, and a non-resources reserved (nRR) queue family.

21. A system as claimed in claim 20, wherein said R-T queue family comprises a single R-T queue member having a predefined minimum bandwidth.

22. A system as claimed in claim 20, wherein said RR queue family comprises eight RR queue members, each said RR queue member having a minimum bandwidth proportional to a weight assigned to each egress COS level associated with each said RR queue.

23. A system as claimed in claim 20, wherein said non-resources reserved queue family comprises eight nRR queue members, each said nRR queue member having a relative queue priority corresponding to an egress COS level associated with each said nRR queue.

24. A system as claimed in claim 16, wherein said adjacent network is a MPLS network and said packet is an MPLS packet.

25. A system as claimed in claim 16, wherein said port service interface initially directs said packet to said egress queue family according to a second set of parameters for said packet, and then further directs said packet to said egress queue member according to said respective egress queue based on said respective COS.

26. A system as claimed in claim 25, wherein said port service interface further directs unlabelled IP traffic to a respective egress queue member.

27. A method of mediating multi-protocol label switching (MPLS) packet traffic flows between a MPLS network and an asynchronous transmission mode (ATM) network, each MPLS packet traffic flow having associated therewith a set of transmission parameters, said method comprising:
(i) identifying for said MPLS packet traffic flow an ATM egress queue type by utilizing a first set of parameters from said set of transmission parameters;
(ii) associating with said MPLS packet traffic flow one of a predefined number of ATM egress class of service (COS) levels by mapping a second set of parameters from said set of transmission parameters into one of said ATM egress COS levels;
(iii) utilizing said ATM egress COS level associated with said MPLS packet traffic flow to select an ATM egress queue member of said ATM egress queue type identified in step (i), said selected ATM egress queue member being associated with said ATM egress COS level associated with said MPLS packet traffic flow in step (ii); and,
(iv) directing said MPLS packet traffic flow to said identified ATM queue member for forwarding to said ATM network.

* * * * *